Oct. 9, 1923. 1,470,071
A. B. FUHR
RESILIENT VEHICLE WHEEL
Filed Nov. 2, 1922

INVENTOR
A.B.Fuhr
BY
ATTORNEYS

Patented Oct. 9, 1923.

1,470,071

UNITED STATES PATENT OFFICE.

ALBERT B. FUHR, OF MACOMB, ILLINOIS.

RESILIENT VEHICLE WHEEL.

Application filed November 2, 1922. Serial No. 598,572.

*To all whom it may concern:*

Be it known that I, ALBERT B. FUHR, a citizen of the United States, and a resident of Macomb, in the county of McDonough and State of Illinois, have invented a new and useful Improvement in Resilient Vehicle Wheels, of which the following is a full, clear, and exact description.

My invention relates to improvements in resilient vehicle wheels, and it consists in the combinations, constructions, and arrangements herein described and claimed.

An object of my invention is to provide an improvement over the forms of the device disclosed in my prior Patents Nos. 1,387,148, and 1,432,390. In these devices I disclosed a wheel which has a felly yieldingly secured thereto, whereby movement is permitted between the felly and the wheel proper. In the present form of the device I provide means for enclosing the felly and the wheel proper in a resilient casing whereby foreign matter such as dirt and mud is prevented from entering the wheel, and, at the same time, the wheel is resilient so as to take up all shocks due to the uneven road over which the wheel is traveling.

A further object of my invention is to provide a device of the type described which is simple in construction and which has novel means for enclosing the felly and wheel proper in a casing which is also resilient, whereby movement is permitted between the felly and the wheel proper.

Other objects and advantages will appear in the following specification, and the novel features of the invention will be particularly pointed out in the appended claims.

My invention is illustrated in the accompanying drawings forming part of this application, in which—

Figure 1:
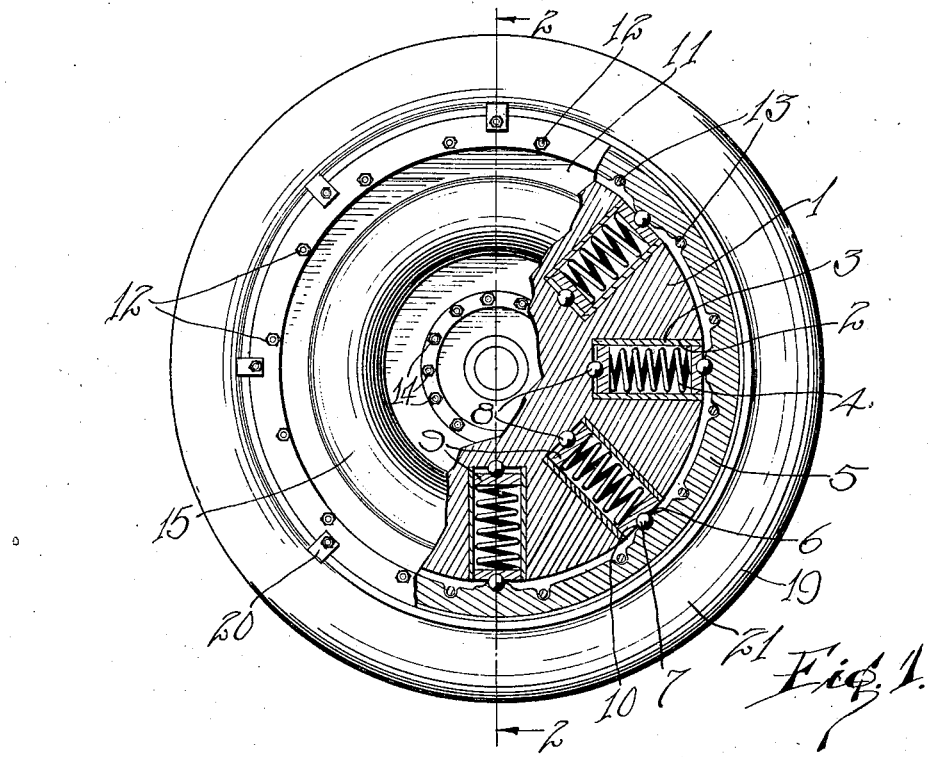
Figure 1 is a side elevation of the device, portions being broken away.

In carrying out my invention, I provide a wheel which comprises a body portion 1, the body portion having slots 2 therein, these slots extending inwardly from the outer periphery of the body portion 1 in a radial direction. Sleeves 3 line the slots 2 and enclose the springs 4.

A felly 5 is disposed around the body portion 1 and is spaced therefrom. The felly has sockets 6 on its inner surface in which ball bearings 7 are disposed. Ball bearings 8 are disposed in the inner ends of the slots 2 and are held in place by discs 9. Discs 10 are slidably received in the slots 2 adjacent to the outer ends thereof, and bear against the ball bearings 7. The springs 4 are disposed between the discs and yieldingly hold the discs in engagement with the ball bearings 7 and 8. In this manner the felly 5 is yieldingly held in engagement with the body portion 1.

Figure 2:
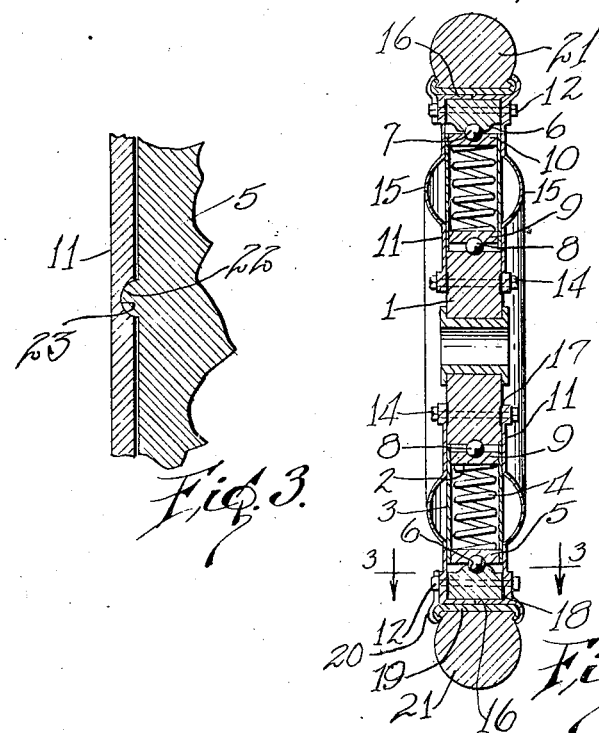
Figure 2 is a section along the line 2—2 of Figure 1.

Means for securing the felly against lateral movement with respect to the body portion is provided and comprises two metal discs 11 which are disposed on each side of the body portion 1 and which carry bolts 12 adjacent to their peripheries, these bolts being received in slots 13 in the inner side of the felly 5. In this manner the felly 5 is adapted to move slightly with respect to the discs 11. A series of bolts 14 are disposed adjacent to the inner periphery of each disc and securely lock the discs to the body portion 1. As will be noted from Figure 2, the bolts 14 extend through the body portion 1 and thereby hold both of the discs to the body portion.

Figure 3:
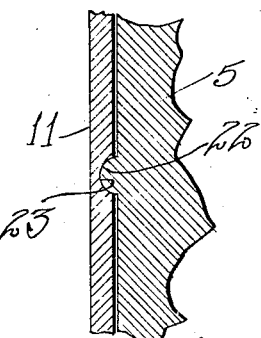
Figure 3 is a section along the line 3—3 of Figure 2.

The discs 11 are also provided with an annular outwardly projecting curved portion 15 which is disposed adjacent to the mid-portions of the slots 2. The metal of the discs 11 is thin enough so as to permit the portions 15 to flex slightly as the felly 5 moves with respect to the body portion 1. It will be noted that the discs 11 entirely enclose the mechanism which yieldingly supports the felly 5 and the body portion 1. This construction prevents any foreign matter from becoming lodged in the slots 2. As clearly shown in Figure 2 the outer edges of the discs 11 are bent inwardly at 16 so as to enclose the felly 5. It will also be noted that gaskets 17 and 18 are disposed adjacent to the bolts 12 and 14 whereby a liquid-tight packing is provided at these points. The felly 5 carries a demountable rim 19 which is ordinary in construction and which is held in place by lugs 20, these lugs also being ordinary in construction. A solid tire 21 is carried by the demountable rim 19. It will be noted from Figure 3 that the felly 5 has one or more radially extending ridges 22 which are received within recesses 23 of the discs 11. In this manner the felly 5 is prevented from rotation with respect to the body portion 1.

From the foregoing description of the various parts of the device, the operation thereof may be readily understood. In assembling the wheel the ball bearings 8, the discs 9, the springs 4 and discs 10 are disposed within the slots 2 of the body portion 1. These members are enclosed by the resilient sleeve 2. Ball bearings 7 are disposed within the recesses in the discs 10 and are also disposed in the sockets 6 of the felly 5 when the felly is disposed upon the body portion 1. The metal discs 11 are now disposed in place and are connected to the body portion 1 and the felly 5 by means of the bolts 12 and 14. The portions of the discs 11 are enlarged or made thicker adjacent to the bolts 12 and 14 so as to provide a greater bearing for the bolts. When the bolts 12 and 14 are tightened the gaskets 17 and 18 will prevent any foreign matter from entering between the felly 5 and the body portion 1.

In operation of the device, the felly 5 is adapted to move with respect to the body portion 1. The springs 4 take the place of the pneumatic tire and it will therefore be observed that the solid tire 21 can be used in place of the pneumatic tire. The curved portion 15 of the discs 11 permit the discs to flex when the felly 5 moves with respect to the body portion 1. In this manner the wheel is made very flexible in that it can absorb the shocks of the roller and at the same time is made dirt and water-proof so that the operating parts will be kept clean and will therefore last a relatively long time. The device is very simple in construction and is not likely to easily get out of order. It closely resembles the ordinary disc wheel now on the market and has an advantage over the ordinary wheel in that it makes use of a solid tire in place of the ordinary pneumatic tire.

It should be noted that the portion 15 which is disposed adjacent to the ground is adapted to be flexed or bulged outwardly to a slight extent. The rim 5 is not rigidly secured to the discs 11. This construction permits the part of the rim furthest removed from the ground to move slightly with respect to the discs 11. It will therefore be apparent that only the part of the portion 15 that is disposed adjacent to the ground will flex.

I claim:

1. A resilient wheel comprising a body portion having radial slots extending inwardly from the periphery thereof, a felly disposed around and spaced from the periphery, spring means mounted in said slots for yieldingly securing the felly to said body, and resilient discs secured to said body and said felly and being adapted to keep foreign matter from entering the wheel.

2. A resilient wheel comprising a body portion having radial slots extending inwardly from the periphery thereof, a felly disposed around and being spaced from the periphery, springs mounted in said slots, discs disposed in said slots and abutting said springs, ball bearings disposed between said discs and said body portion and said felly, and resilient metal discs disposed on the outside of said body and being secured to said body and said felly.

3. A resilient wheel comprising a body portion having radial slots extending inwardly from the periphery thereof, a felly concentrically disposed about said body and being spaced therefrom, spring means disposed in said slots for yieldingly holding said felly to said body, resilient metal discs disposed on the outsides of said wheel and being secured to the body portion by bolts, said felly having grooves on its inner surface, and bolts connecting the outer ends of said discs to each other, said bolts being received in said grooves, whereby foreign matter is prevented from entering between the felly and the body portion.

ALBERT B. FUHR.